(12) United States Patent
Segawa

(10) Patent No.: US 11,372,597 B2
(45) Date of Patent: Jun. 28, 2022

(54) INFORMATION PROCESSING SYSTEM, AND NON-TRANSITORY COMPUTER READABLE MEDIUM

(71) Applicant: FUJIFILM BUSINESS INNOVATION CORP., Tokyo (JP)

(72) Inventor: Shuhei Segawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 187 days.

(21) Appl. No.: 16/536,363

(22) Filed: Aug. 9, 2019

(65) Prior Publication Data

US 2020/0065033 A1 Feb. 27, 2020

(30) Foreign Application Priority Data

Aug. 23, 2018 (JP) .............................. JP2018-156545

(51) Int. Cl.
*G06F 3/12* (2006.01)
*G06Q 10/04* (2012.01)
*G06Q 30/02* (2012.01)

(52) U.S. Cl.
CPC .......... *G06F 3/1205* (2013.01); *G06F 3/1252* (2013.01); *G06F 3/1254* (2013.01); *G06Q 10/047* (2013.01); *G06Q 30/0276* (2013.01)

(58) Field of Classification Search
CPC combination set(s) only.
See application file for complete search history.

(56) References Cited

U.S. PATENT DOCUMENTS

| | | | |
|---|---|---|---|
| 2006/0082803 A1* | 4/2006 | Nishikawa | G06F 3/125 358/1.13 |
| 2007/0246532 A1* | 10/2007 | Nunez | G06F 3/1205 235/383 |
| 2014/0273847 A1* | 9/2014 | Nixon | G06F 3/048 455/41.2 |
| 2017/0228783 A1* | 8/2017 | Theisen | G06Q 30/0276 |
| 2018/0165047 A1* | 6/2018 | Nishio | G06Q 30/02 |
| 2019/0213212 A1* | 7/2019 | Adato | G06F 16/55 |

FOREIGN PATENT DOCUMENTS

JP 2017-162467 A 9/2017

\* cited by examiner

*Primary Examiner* — Helen Zong
(74) *Attorney, Agent, or Firm* — Oliff PLC

(57) ABSTRACT

An information processing system includes an information acquisition unit that acquires information on multiple bulletins to be posted in posting locations that are different from each other, a determination unit that determines, based on the information, an order of visitation according to which a worker posting bulletins visits each of the posting locations, and an instruction unit that provides an instruction to output printed matter that accounts for the order of visitation determined.

11 Claims, 16 Drawing Sheets

FIG. 7

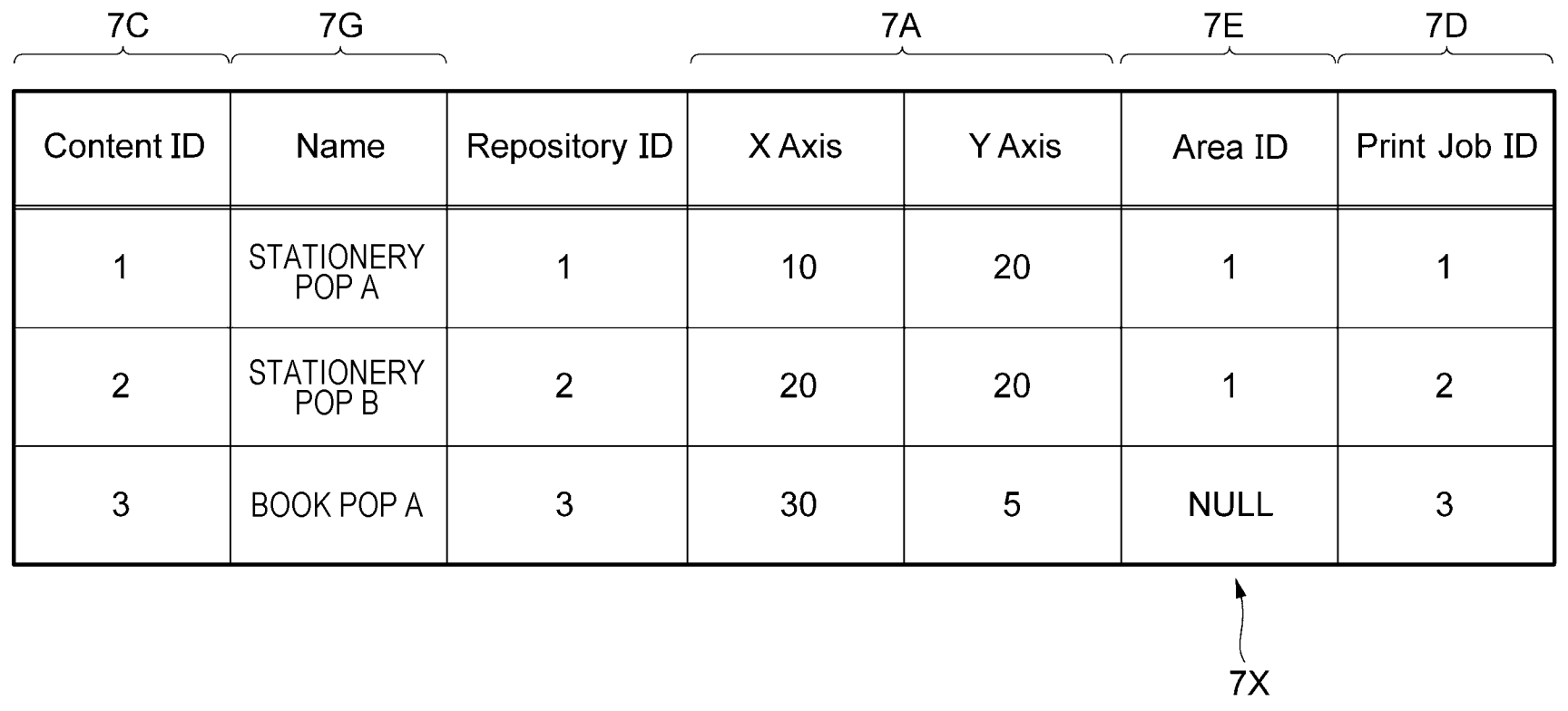

| Content ID | Name | Repository ID | X Axis | Y Axis | Area ID | Print Job ID |
|---|---|---|---|---|---|---|
| 1 | STATIONERY POP A | 1 | 10 | 20 | 1 | 1 |
| 2 | STATIONERY POP B | 2 | 20 | 20 | 1 | 2 |
| 3 | BOOK POP A | 3 | 30 | 5 | NULL | 3 |

# INFORMATION PROCESSING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-156545 filed Aug. 23, 2018.

BACKGROUND

(i) Technical Field

The present disclosure relates to an information processing system, and a non-transitory computer readable medium.

(ii) Related Art

Japanese Unexamined Patent Application Publication No. 2017-162467 discloses an advertisement generation system. The disclosed advertisement generation system includes a unit that generates, based on advertisement generation data and product data, advertisement data corresponding to a product indicated by the product data from among products described by the advertisement generation data.

Multiple bulletins related to products may be posted in stores. A worker may visit each of posting locations of the bulletins to post the bulletins. Depending on an order of visitation, the route the worker takes may be a detour or the worker may carry heavy bulletins for a long distance. Also, depending on the order of visitation, working efficiency of the worker may decrease.

SUMMARY

Aspects of non-limiting embodiments of the present disclosure relate to increasing working efficiency more in posting of multiple bulletins than when the order of visitation of a worker is not accounted for.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing system. The information processing system includes an information acquisition unit that acquires information on multiple bulletins to be posted in posting locations that are different from each other, a determination unit that determines, based on the information, an order of visitation according to which a worker posting bulletins visits each of the posting locations, and an instruction unit that provides an instruction to output printed matter that accounts for the order of visitation determined.

BRIEF DESCRIPTION OF THE DRAWINGS

Exemplary embodiment of the present disclosure will be described in detail based on the following figures, wherein:

FIG. 7 illustrates information stored on a posting information memory;

DETAILED DESCRIPTION

Figure 1:
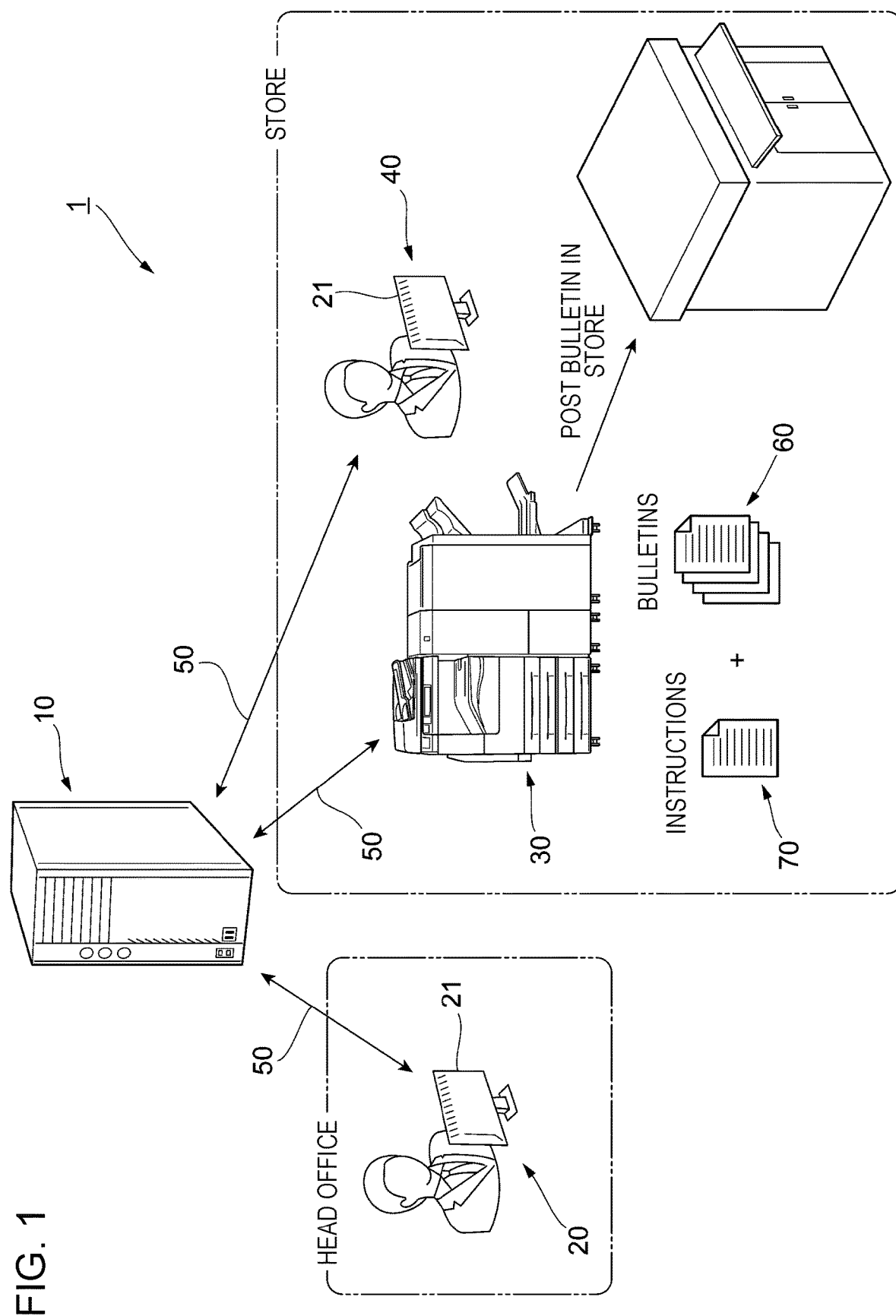
FIG. 1 illustrates the whole configuration of an information processing system of an exemplary embodiment.

An exemplary embodiment of the disclosure is described below in connection with the drawings. FIG. 1 illustrates the whole configuration of an information processing system 1 of the exemplary embodiment. The information processing system 1 of the exemplary embodiment includes a control server 10, a head-office terminal 20, an image forming apparatus (printer) 30 installed in each store, and a store terminal 40 installed in each store. Each of the control server 10, the head-office terminal 20, and the store terminal 40 includes a computer. The control server 10, the head-office terminal 20, the image forming apparatus 30, and the store terminal 40 are connected to each other via a communication network 50, such as the Internet.

The image forming apparatus 30 forms an image on a sheet of paper or resin, serving as a recording medium, using an electrophotographic system or an ink-jet system. The image forming apparatus 30 thus generates bulletins 60 that are going to be posted in each store. The image forming apparatus 30 also forms an image on a paper sheet, thereby generating an instruction sheet 70 that is handed over to a worker who is going to post the bulletins 60. The image formation method of the image forming apparatus 30 is not limited to the electrophotographic system or the ink-jet system. The image forming apparatus 30 may use a different system.

The "bulletins 60" refer to printed matter that is posed at a posting location and viewed by people present close to the posting location. The bulletin 60 is not limited to any particular type or size. For example, the bulletin 60 may be a poster. Also, the bulletin 60 may be as small as a sticker that is stuck onto a product. The bulletin 60 is not limited to any shape. For example, the bulletin 60 may have a rectangular shape, such as a poster. The bulletin 60 may be a strip, or may have a polygonal shape, such as a triangle. The posting method of the bulletin 60 is not limited to any particular method. The bulletin 60 may be put on a wall, like a poster. For example, the bulletin 60 on a rigid strip may be fixed onto a wall with the face of the bulletin 60 perpendicular to the wall.

Figure 2:
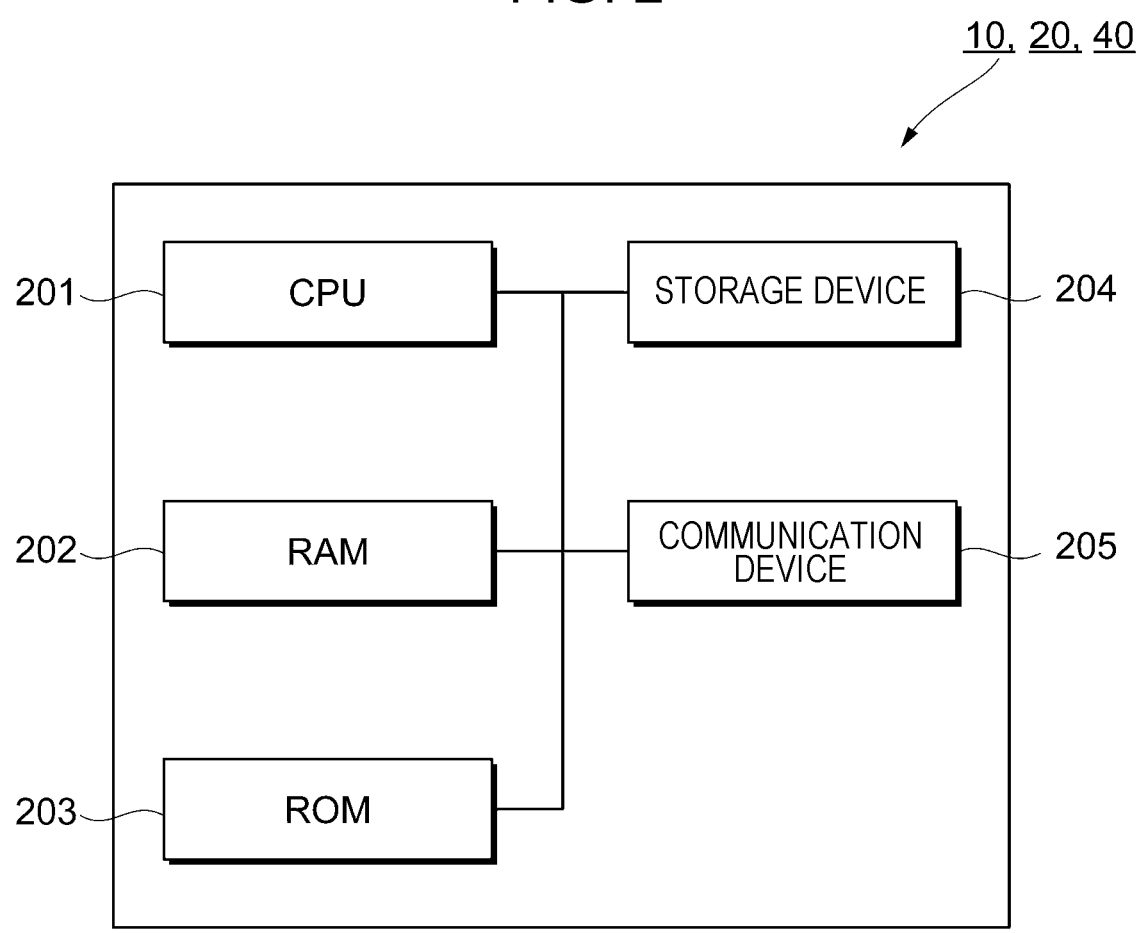
FIG. 2 illustrates the hardware configuration of a control server, a head office terminal, and a store terminal.

FIG. 2 illustrates the hardware configuration of each of the control server 10, the head-office terminal 20, and the store terminal 40. Each of the control server 10, the head-office terminal 20, and the store terminal 40 includes a computer. Each of the control server 10, the head-office terminal 20, and the store terminal 40 includes a central processing unit (CPU) 201, a random-access memory (RAM) 202, and a read-only memory (ROM) 203, a storage device 204 including a hard disk, and a communication device (communication interface) 205 that performs communication with the outside.

The ROM 203, and the storage device 204 store a program executed by the CPU 201. The CPU 201 reads the program stored on the ROM 203 or the storage device 204, and executes the program using the RAM 202 as a working area. The functionalities of the elements described below are implemented when the CPU 201 executes the program stored on the ROM 203 or the storage device 204.

The program to be executed by the CPU 201 may be provided to each of the control server 10, the head-office terminal 20, and the store terminal 40 in the form thereof recorded on one of computer readable recording media. The computer readable recording media include a magnetic recording medium (a magnetic tape or a magnetic disk), an electromagnetic recording medium (an optical disk), and a semiconductor memory. The program to be executed by the CPU 201 may be downloaded to each of the control server 10, the head-office terminal 20, and the store terminal 40 via a communication system, such as the Internet. Referring to FIG. 1, each of the head-office terminal 20 and the store terminal 40 includes a display 21 that displays information to the operator.

Figure 3:
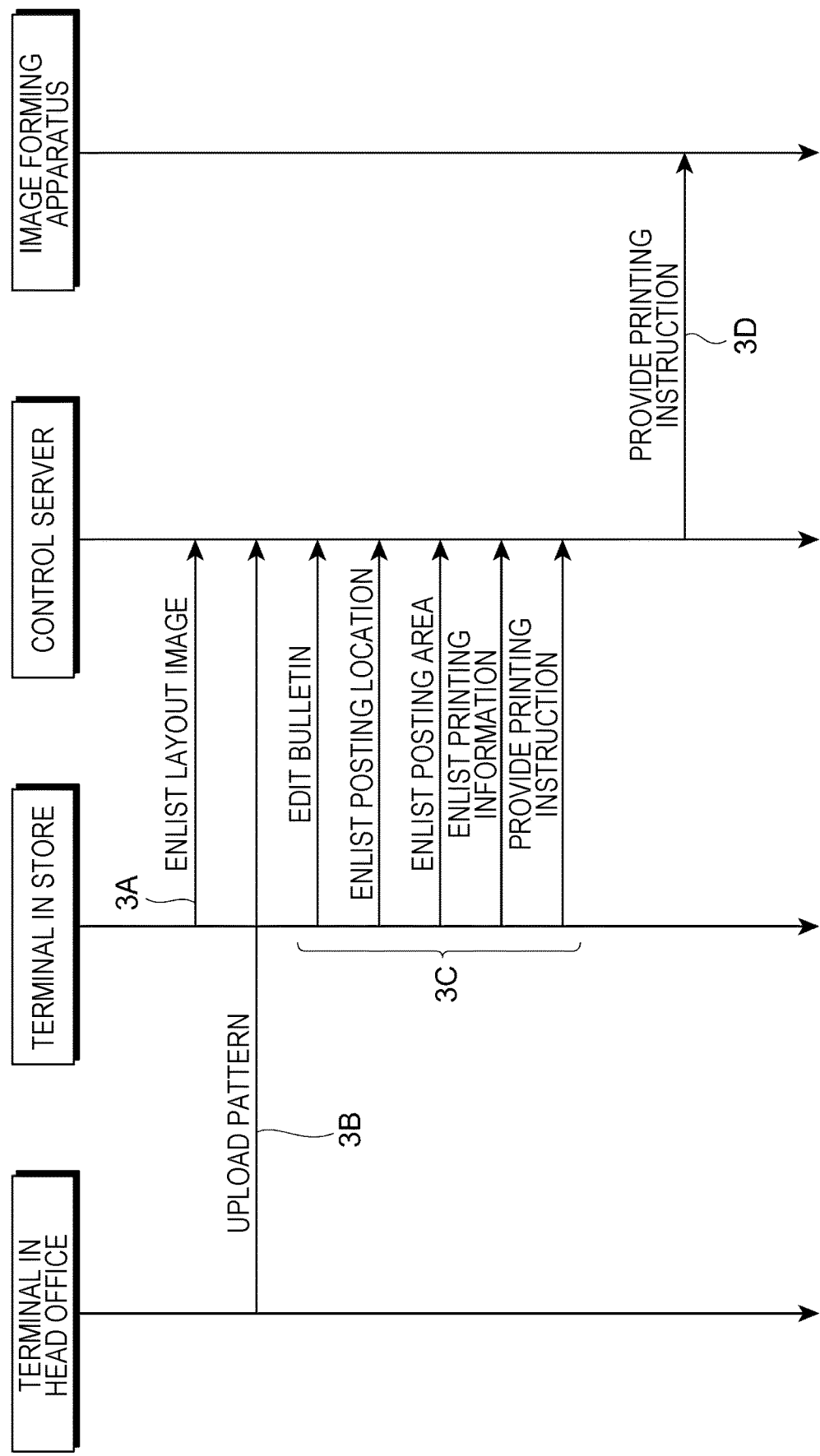
FIG. 3 generally illustrates a process performed by the information processing system.

FIG. 3 generally illustrates the process performed by the information processing system 1. According to the exemplary embodiment, referring to reference numeral 3A of FIG. 3, the operator in a store (hereinafter referred to as a "store operator") enlists an image indicating the layout of the inside of the store (hereinafter referred to as a "layout image 22") via the store terminal 40. In other words, the store operator enlists the image of the internal structure of the store. The layout image 22 is transmitted to the control server 10 to be stored there.

According to the exemplary embodiment, as indicated by reference number 3B, the operator in a head office (hereinafter referred to as a "head-office operator") enlists a pattern of the bulletin 60 posted in each store via the head-office terminal 20. The pattern of the bulletin 60 is transmitted to the control server 10 to be stored there.

According to the exemplary embodiment, as indicated by reference numeral 3C, the store operator edits the bulletin 60, enlists a positing location, a positing area, printing information, and provides an instruction to print via the store terminal 40. These operations performed by the store operator are described in detail below. According to the exemplary embodiment, as indicated by reference numeral 3D, the control server 10 provides the instruction to print to the image forming apparatus 30 in each store.

Figure 4:
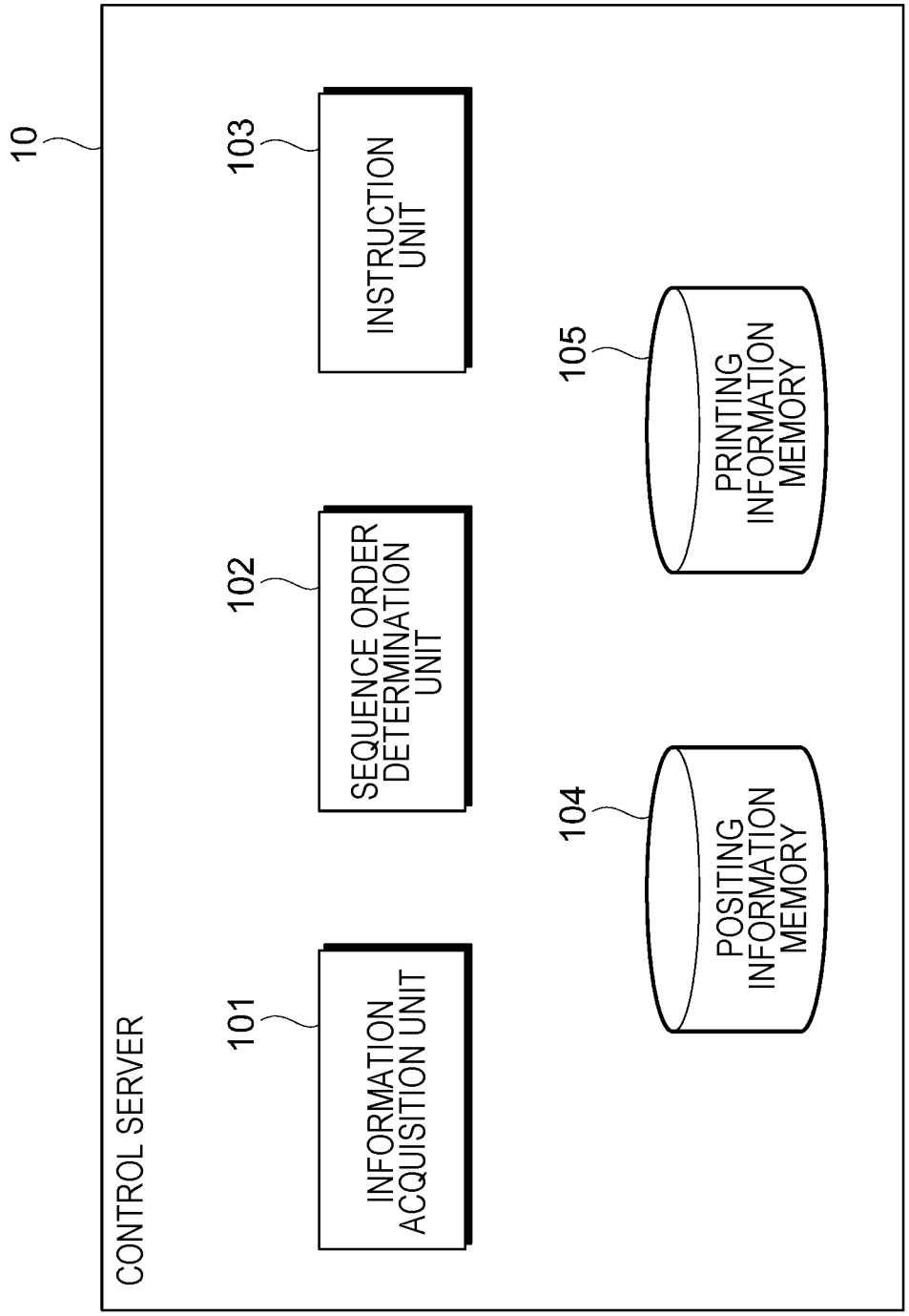
FIG. 4 illustrates the functionality of the control server.

FIG. 4 illustrates the functionalities of the control server 10. FIG. 4 focuses on function blocks related to posting of the bulletin 60. The control server 10 includes function blocks, namely, an information acquisition unit 101, an order determination unit 102, an instruction unit 103, a posting information memory 104, and a printing information memory 105. The information acquisition unit 101, the order determination unit 102, and the instruction unit 103 are implemented when the CPU 201 executes the program stored on the ROM 203 or the storage device 204. The posting information memory 104 and the printing information memory 105 are implemented by the storage device 204.

The information acquisition unit 101 acquires information on the bulletins 60 posted in each store. The order determination unit 102 serving as a determination unit determines an order of visitation according to which a worker (a worker who posts the bulletins 60) sequentially visits the positing locations (of the bulletins 60).

The instruction unit 103 provides an instruction to output printed matter that accounts for the order of visitation determined by the order determination unit 102. The posting information memory 104 stores information related to the bulletins 60, such as information indicating the posting location of the bulletins 60. The printing information memory 105 stores information related to the printing of the bulletins 60, such as the number of copies of each of the bulletins 60.

Figure 5:
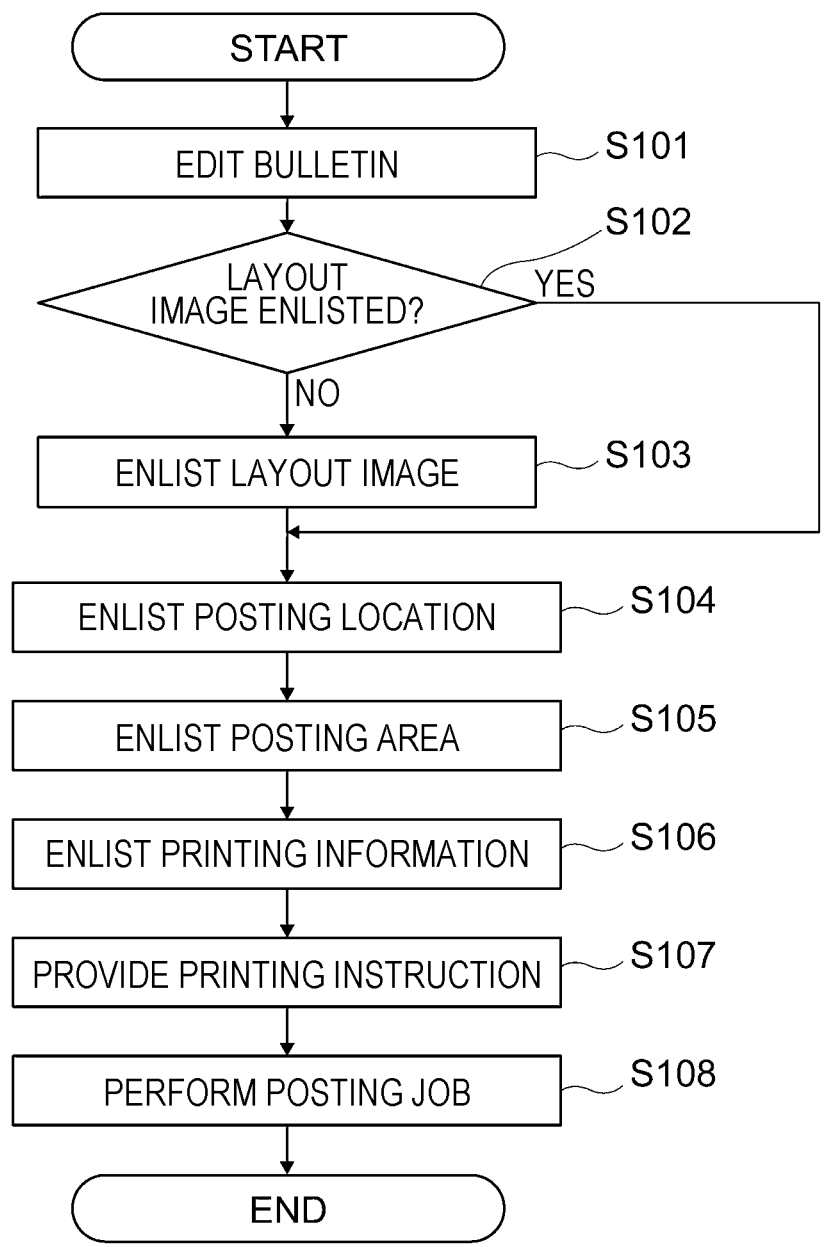
FIG. 5 is a flowchart illustrating a process performed by the information processing system of the exemplary embodiment.

FIG. 5 is a flowchart illustrating the process performed by the information processing system 1 of the exemplary embodiment. According to the exemplary embodiment, the store operator edits the bulletins 60 by operating the store terminal 40 (step S101). More specifically, the store operator generates the bulletins 60 appropriate for each store by editing the pattern of the bulletins 60 enlisted on the control server 10.

According to the exemplary embodiment, the control server 10 determines whether the layout image 22 has been enlisted on the control server 10 (step S102). If the layout image 22 has not been enlisted, the store operator operates the store terminal 40 to enlist the layout image 22 (step S103). More specifically, if the layout image 22 has not been enlisted on the control server 10, information indicating that the layout image 22 is not enlisted is displayed on the store terminal 40. In response, the store operator enlists the layout image 22.

According to the exemplary embodiment, the store operator operates the store terminal 40 to enlist the posting location of each of the bulletins 60 edited (generated) in step S101 (step S104). The posting location is transmitted to and enlisted on the control server 10. It will be noted that the posting location is enlisted on the control server 10 in association with the corresponding bulletin 60.

Figure 6:
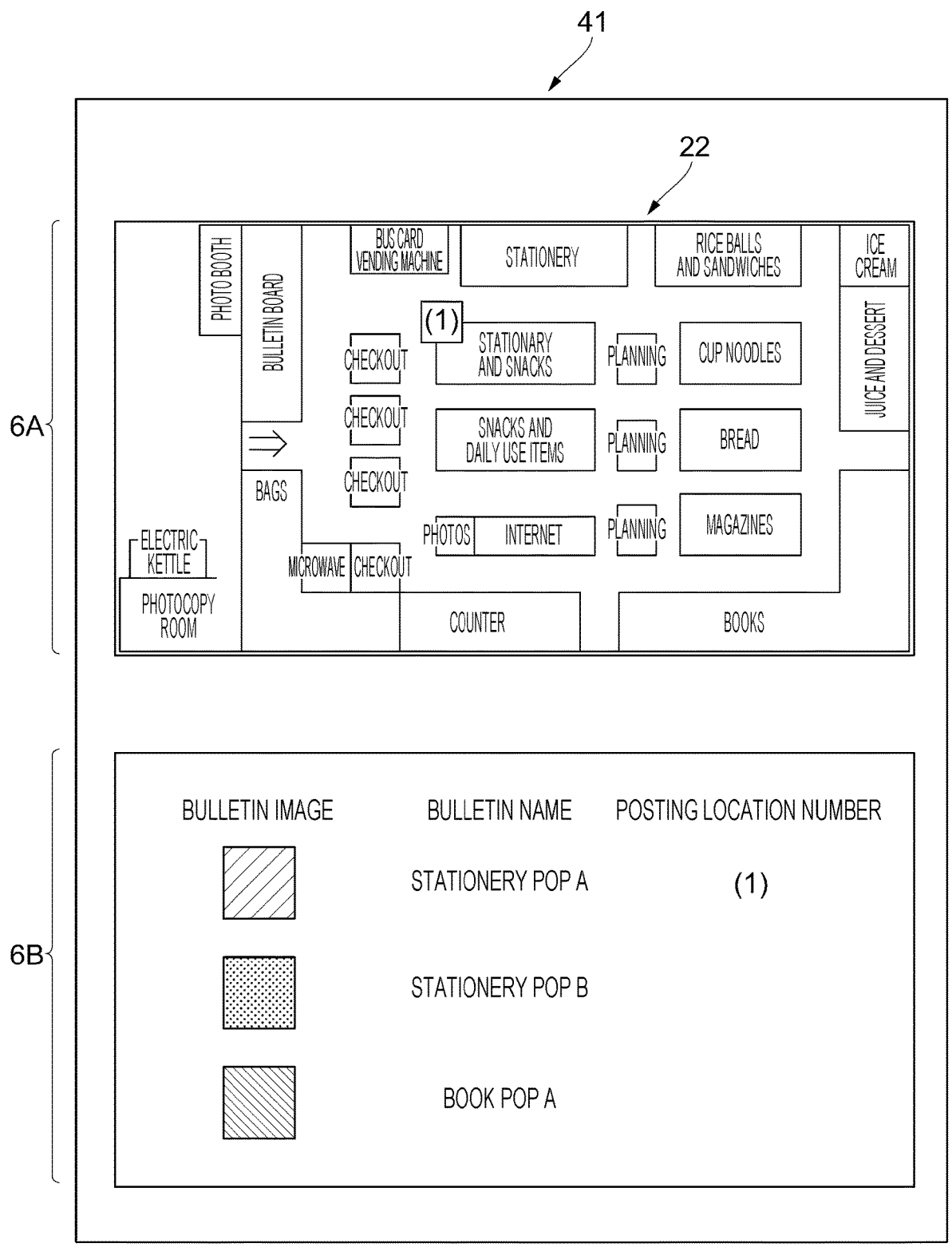
FIG. 6 illustrates a display screen of the store terminal displayed when a store operator enlists posting locations.

FIG. 6 illustrates a display screen 41 of the store terminal 40 displayed when the store operator enlists posting locations. According to the exemplary embodiment, the display screen 41 of FIG. 6 is displayed on the store terminal 40 when the store operator enlists the posting locations. An enlisted layout image 22 is displayed on the upper portion of the display screen 41 as indicated by reference number 6A. The list of the bulletins 60 edited (generated) by the store operator in step S101 is displayed on the lower portion of the display screen 41 as indicated by reference numeral 6B. It will be noted that information on the bulletins 60 to be posted in the store is displayed on the lower portion of the display screen 41.

According to the exemplary embodiment, the store operator enlists the posting location of the bulletins 60 by selecting a portion of the layout image 22 of FIG. 6. Specifically, the store operator identifies the bulletin 60, the posting location of which is to be enlisted, from the list of the bulletins 60 (from among multiple types of bulletins 60 displayed on the lower portion of the display screen 41) and then selects a portion of the layout image 22. In this way, the posting location of the bulletin 60 is selected. The posting location thus identified is transmitted to the control server 10, and then enlisted on the control server 10. It will be noted that the posting location is enlisted on the control server 10 in association with the bulletin 60.

Referring to FIG. 6, the store operator identifies a bulletin 60 referred to as a stationery point of purchase (POP) A, and selects a portion (1) of the layout image 22. According to the exemplary embodiment, the location information (location information indicating the location (1)) is associated with the bulletin 60 referred to as the stationery POP A, and is then enlisted on the control server 10. Concerning a stationery POP B and a book POP A, the store operator also identifies the posting locations of the stationery POP B and the book POP A, and the posting locations of the stationery POP B and the book POP A are enlisted (this operation is not illustrated in FIG. 6).

FIG. 7 illustrates information to be stored on the posting information memory 104. According to the exemplary embodiment, the location information indicating the posting location of each bulletin 60 is enlisted on the control server 10. The location information (hereinafter referred to as "posting location information") is enlisted on the posting information memory 104 in the control server 10.

According to the exemplary embodiment, referring to reference numeral 7A in FIG. 7, a position along an X axis, and a position along a Y axis in a store are enlisted as the posting location information. Furthermore, according to the exemplary embodiment, with reference to reference numerals 7C and 7D, content identification (ID) and print job ID are enlisted in association with each bulletin 60 as identification information identifying each bulletin 60. With reference to reference numeral 7G, information on the name of each bulletin is stored on the posting information memory 104.

Figure 8:
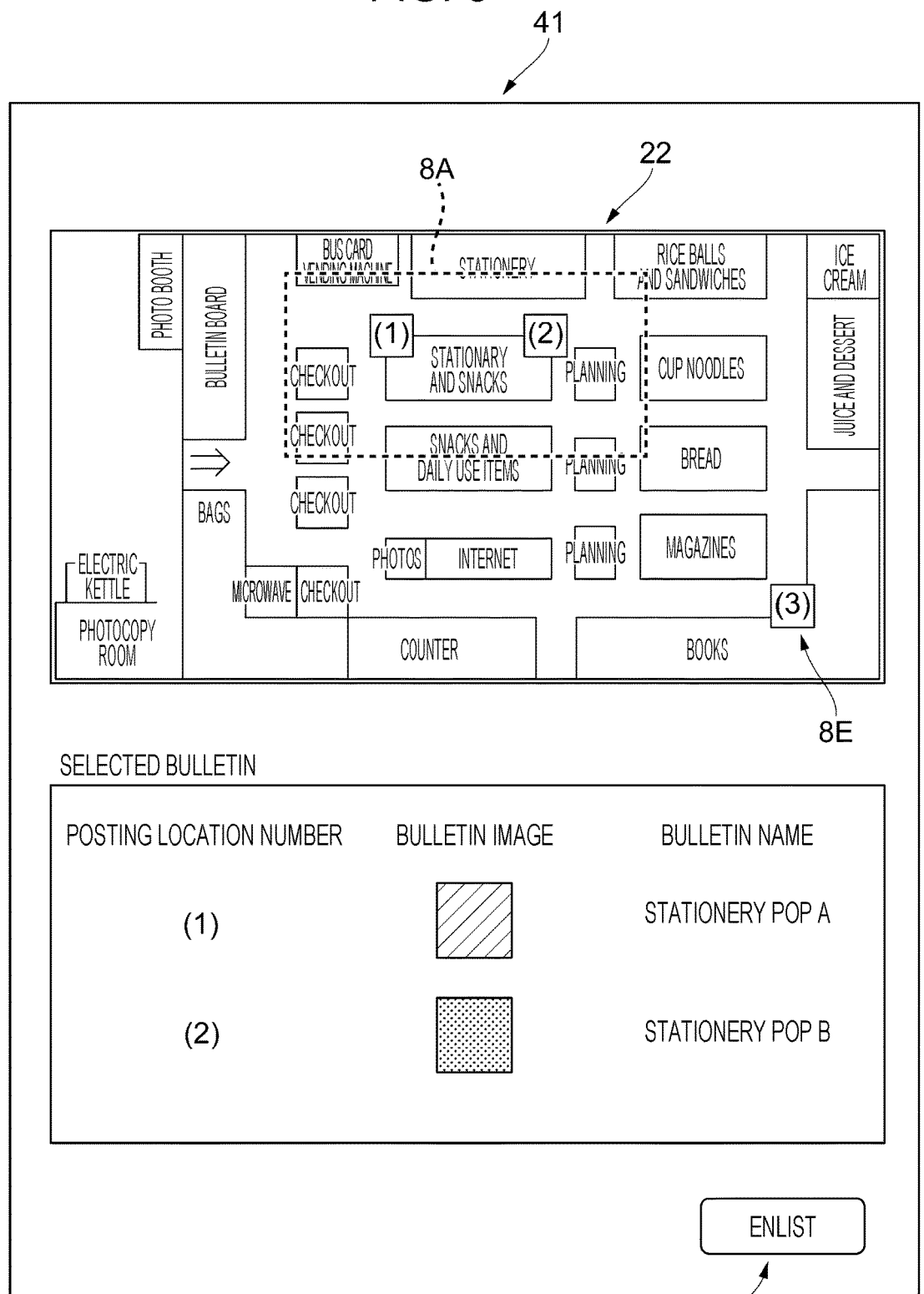
FIG. 8 illustrates a display screen of the store terminal displayed when the store operator enlists a posting area.

Returning to FIG. 5, the process is described further. In step S105, the store operator operates the store terminal 40 to enlist a posting area where the bulletin 60 is to be posted. FIG. 8 illustrates the display screen 41 of the store terminal 40 when the store operator enlists the posting area.

The layout image 22 is displayed on the upper portion of the display screen 41 of FIG. 8, and images (1) and (2) that are posting areas of the stationery POP A and the stationery POP B are displayed on the layout image 22. An image (3) that is a posting area of the book POP A of FIG. 6 is displayed as indicated by reference numeral 8E.

In the display example of FIG. 8, the store operator selects a portion of the layout image 22. Specifically, in the display example, the store operator selects a rectangular area indicated by reference numeral 8A. More specifically, the area containing the posting locations (1) and (2) is selected.

According to the exemplary embodiment, the area selected by the store operator becomes the posting area where the bulletin 60 is to be posted. The store operator selects an area from the layout image 22, and enlists the posting area. In the display screen 41 of FIG. 8, information on each bulletin 60 contained in the posting area (the area selected by the store operator) is displayed at a location (indicated by reference numeral 8B) on the lower portion of the display screen 41. In other words, the information on the bulletin 60 that is going to be posted in the posting area is displayed on the lower portion of the display screen 41.

According to the exemplary embodiment, an enlist button 44 is displayed on the bottom right corner of the display screen 41. When the store operator selects the enlist button 44, information on the posting area selected by the store operator is transmitted to the control server 10. The control server 10 enlists the posting area in association with the bulletin 60 located in the posting area.

The information on the posting area is thus enlisted on the posting information memory 104 of FIG. 7. Specifically, according to the exemplary embodiment, an area ID is assigned to each posting area to identify the posting area. With reference to reference numeral 7E of FIG. 7, the area ID is enlisted on the posting information memory 104 with the area ID associated with the bulletin 60. More specifically, according to the exemplary embodiment, an area ID "1" is assigned to the selected posting area (the rectangular area indicated by reference numeral 8A of FIG. 8), and is enlisted on the posting information memory 104 with the area ID "1" associated with each of the stationery POP A and the stationery POP B.

According to the exemplary embodiment, the posting areas represented by the XY coordinates are individually enlisted on the control server 10 in association with the corresponding area IDs. It will be noted that in the exemplary embodiment the area ID only is enlisted on the posting information memory 104. Referring to reference numeral 8E of FIG. 8, the posting location of the book POP A (labeled with (3)) is outside the posting area, and the area ID "1" is not associated with the book POP A as illustrated by reference numeral 7X of FIG. 7.

Returning to FIG. 5, the process is further described. In step S106, printing information is enlisted. To enlist the printing information, the store operator enlists the printing information by operating the store terminal 40. Specifically, the store operator enlists information used to print each of the bulletins 60, such as the number of copies of each of the bulletins 60.

Figure 9:
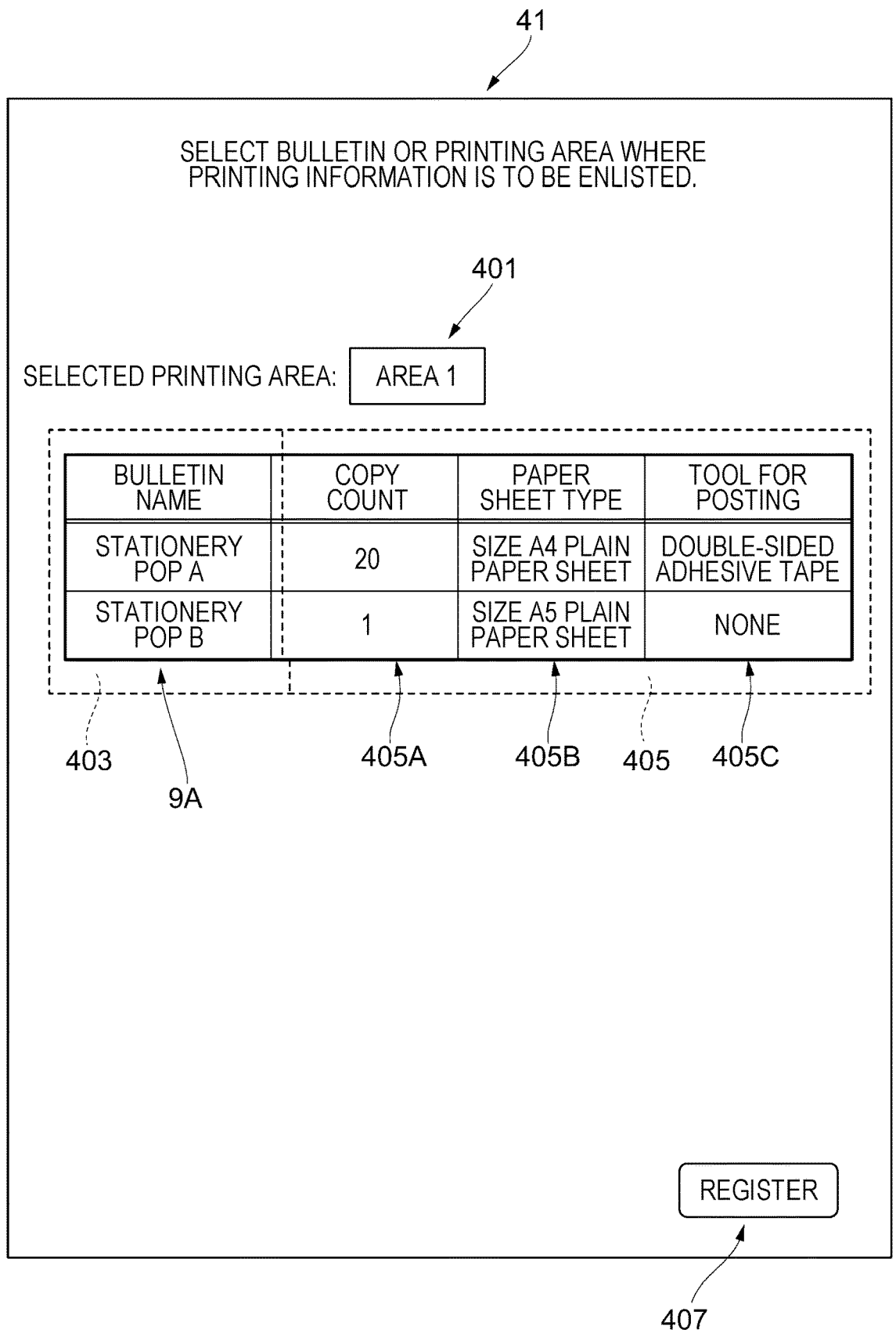
FIG. 9 illustrates the display screen of the store terminal during the enlisting of printing information.

FIG. 9 illustrates the display screen 41 of the store terminal 40 during the enlisting of the printing information. The display screen 41 includes a posting area selection box 401, and multiple posting areas that the store operator has enlisted are displayed in the posting area selection box 401. The posting area selection box 401 is displayed in a pull-down way. When a pointer is placed on the posting area selection box 401 using a mouse, the multiple posting areas enlisted are displayed in a vertical arrangement.

With reference to FIG. 8, the store operator selects only one posting area. According to the exemplary embodiment, the store operator may select (enlist) another posting area. In such a case, multiple posting areas are displayed in the posting area selection box 401 as illustrated in FIG. 9. Referring to FIG. 9, an area 1 is finally selected as a posting area.

According to the exemplary embodiment, with reference to reference numeral 9A, information on the bulletins 60 contained in the posting area selected by the store operator is displayed below the posting area selection box 401 and on the leftmost portion of the display screen 41. Specifically, the names of the bulletins 60 are displayed. It will be noted that according to the exemplary embodiment a name display column 403 displaying the name of the bulletins 60 is arranged, and the names of the bulletins 60 contained in the selected posting area are displayed.

According to the exemplary embodiment, printing information columns 405 are arranged to the right of the name display column 403, and the store operator enters printing information in the printing information columns 405. Specifically, the printing information columns 405 include a copy count input column 405A, a paper sheet information input column 405B, and a tool information input column 405C. The copy count input column 405A receives the number of copies of each bulletin 60. The paper sheet information input column 405B receives information on the paper sheet used for the generation of the bulletin 60. The tool information input column 405C receives information on a tool that is used to post the bulletin 60.

In the example of FIG. 9, the information on the book point of purchase (POP) A indicates that the number of copies of the book POP A is 20, that size A5 plain paper sheets are used, and that no tool is used in the posting. The tool that is used to post the bulletin 60 may include a tool which serves the purpose thereof by being stored at the posting location of the bulletin 60 or a tool, such as a screw driver, which serves the purpose thereof by being carried from one posting location to another.

According to the exemplary embodiment, an enlist button 407 is displayed on the bottom portion of the display screen 41. When the enlist button 407 is selected, the printing information (each piece of the printing information input to the printing information columns 405) input by the store operator is transmitted to the control server 10. The printing information is thus enlisted on the control server 10 in association with the bulletin 60. Specifically, the printing information is stored on the printing information memory 105 in the control server 10.

Figure 10:
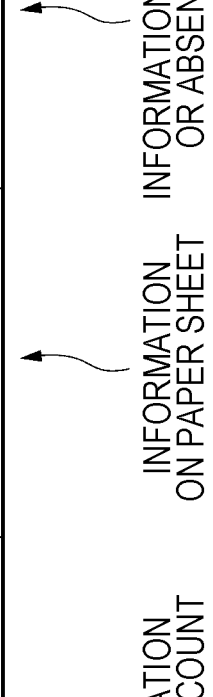
FIG. 10 illustrates a printing information memory.

FIG. 10 illustrates the printing information memory 105. The printing information memory 105 in the control server 10 stores the printing information transmitted from the store terminal 40. Specifically, the information on the number of copies, the information on the paper sheets, and the information on the presence or absence of a tool are stored on the printing information memory 105.

The information on the number of copies, the information on the paper sheets, and the information on the presence or absence of the tool are stored in association with each bulletin 60 on the printing information memory 105. Specifically, the information on the number of copies, the information on the paper sheets, and the information on the presence or absence of the tool are enlisted in association with the print job ID.

The print job ID matches the print job ID stored on the posting information memory 104 (see FIG. 7). According to the exemplary embodiment, the information on the number of copies, the information on the paper sheets, and the information on the presence or absence of the tool are associated with each bulletin 60 via the print job ID (associated with each bulletin 60 of FIG. 7).

Figure 11:
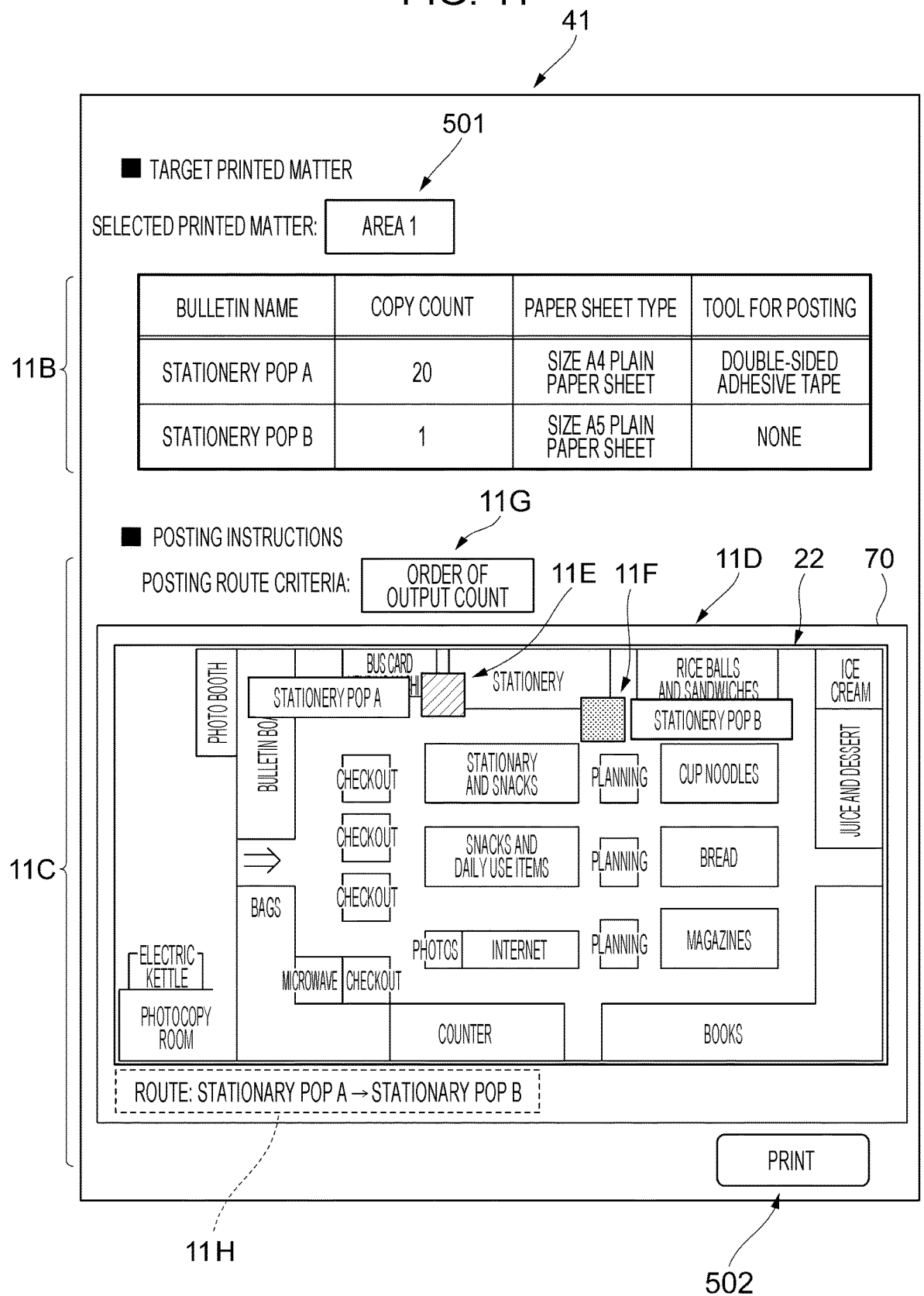
FIG. 11 illustrates the display screen of the store terminal immediately before a printing instruction is provided.

Returning to FIG. 5, the process is further described. In step S107, the store operator does the final check via the store terminal 40, and provides a print instruction. FIG. 11 illustrates the display screen 41 of the store terminal 40 immediately prior to when the pint instruction is provided. The display screen 41 of FIG. 11 includes on the top portion thereof a posting area display box 501 that displays the posting area selected by the store operator. In this example, the area 1 is displayed as the posting area. It will be noted that according to the exemplary embodiment the area 1 is selected on the display screen 41 of FIG. 9, and thus the area 1 is displayed on the display screen 41 of FIG. 11.

According to the exemplary embodiment, referring to reference numeral 11B of FIG. 11, the printing information input by the store operator (the printing information input in step S106) is displayed. Specifically, the information on the number of copies, the information on the paper sheets, and the information on the presence or absence of the tool are displayed for each the bulletins 60 to be printed.

According to the exemplary embodiment, referring to reference numeral 11C of FIG. 11, a screen used to generate the instruction sheet 70 (see FIG. 1) is displayed on the lower portion of the display screen 41. It will be noted that a screen (an instruction sheet generation screen) used to generate the instruction sheet 70 to be handed over to a worker who performs a posting job of the bulletin 60 is displayed on the lower portion of the display screen 41.

The worker posting the bulletin 60 successively visits the posting locations of the bulletins 60 in order to post the bulletins 60 there. The screen used to generate the instruction sheet 70 is displayed on the lower portion of the display screen 41. The instruction sheet is printed matter that is to be handed over to the worker who performs the posting job of the bulletins 60. Referring to the instruction sheet 70, the worker performs the posting job of the bulletins 60.

Referring to reference numeral 11D, a preview image of the instruction sheet 70 to be output from now is displayed on the instruction sheet generation screen. The instruction sheet 70 includes the layout image 22. Referring to reference numerals 11E and 11F, information indicating the posting location of each bulletin 60 is displayed on the layout image 22.

Referring to reference numeral 11H, information on the order of visitation according to which the worker successively visits the posting locations is written on the instruction sheet 70. The worker visits the posting locations inside the store in accordance with the order of visitation written on the instruction sheet 70. During the visitation, the worker successively posts the bulletins 60.

Referring to reference numeral 11G, determination criteria selected by the store operator are displayed on the instruction sheet generation screen. Specifically, the determination criteria are displayed in the pull-down way. Multiple determination criteria are displayed at a position labeled with reference numeral 11G.

The multiple determination criteria that are referred to when the order of visitation is determined are displayed at the position labeled with the reference numeral 11G. Specifically, according to the exemplary embodiment, the order determination unit 102 (see FIG. 4) determines the order of visitation. In this operation, the order determination unit 102 determines the order of visitation, based on the determination criterion selected by the store operator. According to the exemplary embodiment, the store operator selects the determination criterion in this way.

In the example of FIG. 11, the store operator selects the "order of output counts" as a determination criterion. The order determination unit 102 determines the order of visitation, based on information on the number of copies of each bulletin 60. Other determination criteria include the order of sizes, the order determined depending on the presence or absence of tools, and the order of posting locations. The store operator may select a determination criterion different from the order of sizes, though this operation is not described herein.

A print button 502 is arranged on the bottom right corner of the display screen 41 of FIG. 11. The print button 502 is finally selected to print the bulletins 60 and the instruction sheet 70. When the print button 502 is selected, the control server 10 provides an instruction to print to the image forming apparatus 30 installed in the store. The image forming apparatus 30 outputs the bulletins 60 and the instruction sheet 70.

Figure 12:
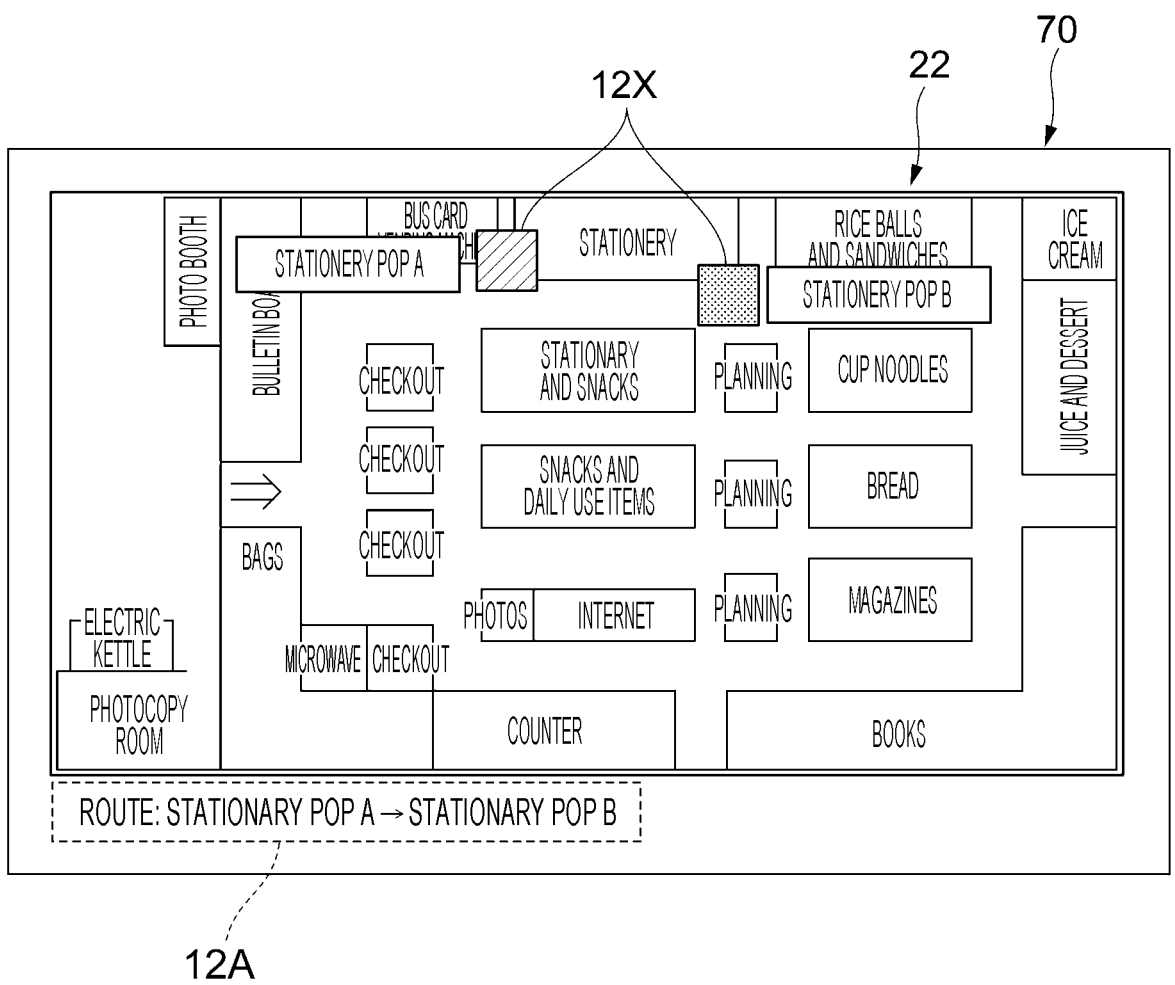
FIG. 12 illustrates output an instruction sheet.

FIG. 12 illustrates the output instruction sheet 70. The layout image 22 is displayed on the instruction sheet 70. Information indicating the posting location of each bulletin 60 is also displayed on the layout image 22. Referring to reference numeral 12A, information on the order of visitation is displayed on the instruction sheet 70. Information on the order of visitation according to which the worker visits the posting locations of the bulletins 60 is displayed on the instruction sheet 70. According to the exemplary embodiment, the information on the order of visitation is written on the instruction sheet 70. The instruction sheet 70 thus accounts for the order of visitation determined by the order determination unit 102. In the example of FIG. 12, the order of visitation is from the stationery POP A to the stationery POP B.

Figure 13:
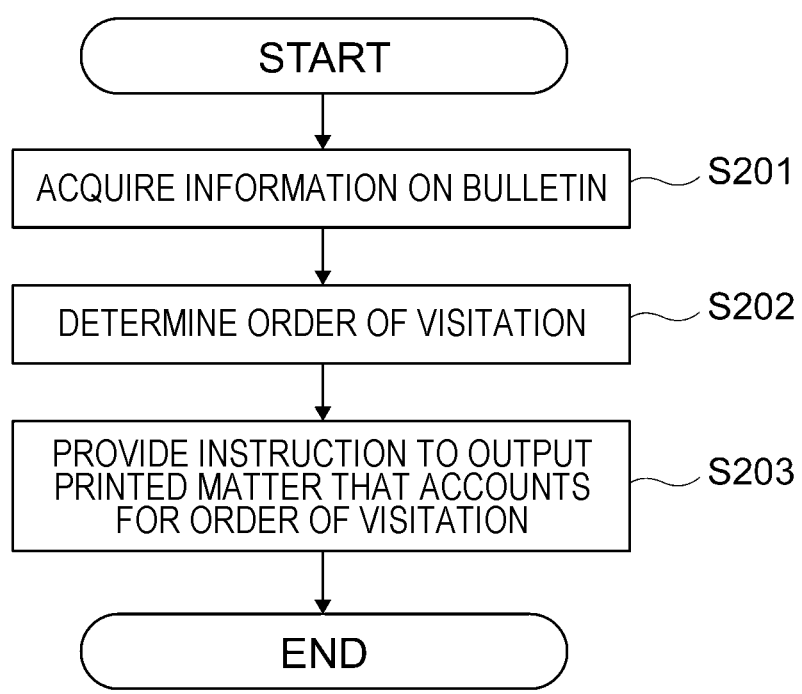
FIG. 13 is a flowchart illustrating in detail an operation performed in step S107.

FIG. 13 is a flowchart illustrating in detail the process performed in step S107. The following discussion focuses on the printing process for the instruction sheet 70. According to the exemplary embodiment, to print the instruction sheet 70, the information acquisition unit 101 acquires information on each of the bulletins 60 that are going to be posted (step S201). The information acquisition unit 101 identifies the bulletin 60 contained in the posting area selected by the store operator, and acquires the information on the identified bulletin 60.

In this example, the information acquisition unit 101 acquires information on the number of copies of each bulletin 60 as the information on each of the bulletins 60. Specifically, according to the exemplary embodiment, the order of copy counts (numbers of copies of the bulletins 60) is selected (see reference numeral 11G of FIG. 11). The information acquisition unit 101 acquires the information on the copy count of each bulletin 60 as the information on each bulletin 60. More specifically, the information acquisition unit 101 refers to the information stored on the printing information memory 105 (see FIG. 10), and acquires the information on the copy count of each bulletin 60.

According to the exemplary embodiment, the order determination unit 102 determines the order of visitation when the worker sequentially visits the posting locations (step S202), based on the information on the copy count acquired by the information acquisition unit 101. Specifically, the information acquisition unit 101 acquires the information on the copy count, and the order determination unit 102 determines the order of visitation, based on the acquired information on the copy count. More specifically, the order determination unit 102 determines the order of visitation such that the worker visits earlier a posting location where each of the bulletins 60 having a larger copy count is to be posted than a posting location where each of the bulletins 60 having a smaller copy count is to be posted.

According to the exemplary embodiment, the instruction unit 103 outputs printed matter that accounts for the order of visitation determined by the order determination unit 102 (step S203). Specifically, the instruction unit 103 provides the instruction to output the instruction sheet 70 on which the information on the order of visitation determined by the order determination unit 102 is written. More specifically, the instruction unit 103 transmits to the image forming apparatus 30 image data on the instruction sheet 70 accounting for the order of visitation and provides a printing instruction for the instruction sheet 70 to the image forming apparatus 30.

The image forming apparatus 30 installed in the store (see FIG. 1) outputs the instruction sheet 70 accounting for the order of visitation together with multiple types of the bulletins 60. Specifically, according to the exemplary embodiment, the instruction sheet 70 like the one illustrated in FIG. 12 is output. As previously described, the instruction sheet 70 includes the layout image 22, the information on the posting locations of the bulletins 60, and the information on the order of visitation. In this example, as illustrated with reference to reference numeral 12A, the instruction sheet 70 includes, as the information on the order of visitation, information indicating that the worker visits the posting location of the stationery POP B after visiting the posting location of the stationery POP A.

Not only the information on the order of visitation but also the information on the posting locations of the bulletins 60 are displayed on the instruction sheet 70 of FIG. 12. Specifically, the information on the posting location of each bulletin 60 is displayed on the instruction sheet 70 by displaying a thumbnail image 12X (identifying each bulletin 60) indicating each bulletin 60 at a position corresponding to the posting location in the layout image 22.

According to the exemplary embodiment, the information on the posting location of each bulletin 60 is displayed by displaying the thumbnail image 12X of the bulletin 60. The layout image 22 and the thumbnail image 12X may not necessarily be displayed. For example, only text information, such as "Stationery POP A is posted on pole A, and stationery POP B is posted on pole B" may be displayed as the information indicating the posting location of the bulletins 60.

Figure 14:
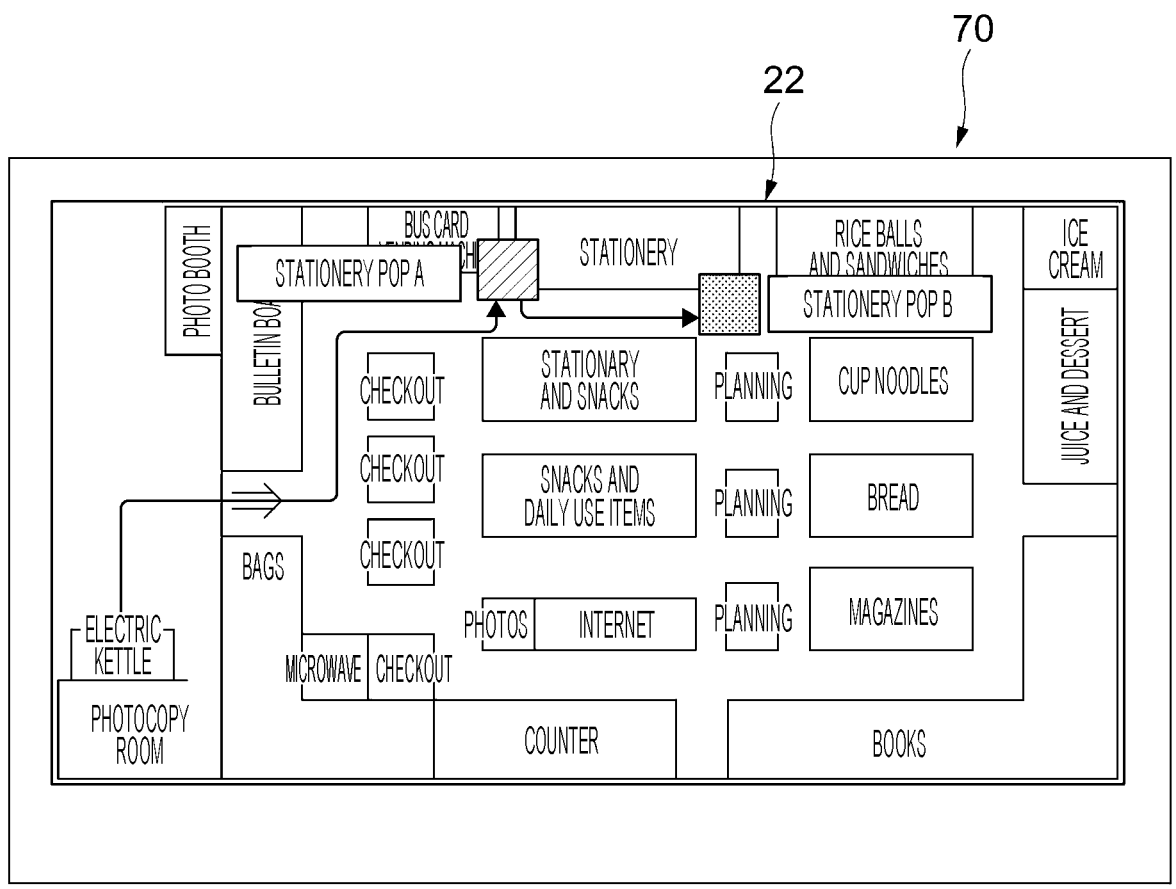
FIG. 14 illustrates another example of the instruction sheet.

According to the exemplary embodiment, the order of visitation is displayed as the text information as illustrated by reference numeral 12A of FIG. 12. Referring to FIG. 14 (another example of the instruction sheet 70), the order of visitation may be displayed by displaying a route in the layout image 22. Furthermore, both the text information and the route information may be displayed together.

As described above, the order of visitation is determined, based on the copy count of each bulletin 60. The order of visitation may be determined based on another determination criterion. For example, the order of visitation may be determined based on one of the other determination criteria including the "order of posting locations", the "order of sizes", and the "order determined depending on whether a tool is present or not".

If the order of visitation is determined based on the "order of posting locations", the information acquisition unit 101 refers to the information (concerning the locations) stored on the posting information memory 104 (see FIG. 7), and acquires the information on the posting location of each bulletin 60. The information acquisition unit 101 also acquires the installation location of the image forming apparatus 30. Based on the acquired information on these locations, the information acquisition unit 101 acquires information on the distance from the image forming apparatus 30 to the posting location of each bulletin 60.

The order determination unit 102 determines the order of visitation, based on the information on the distances. Specifically, the order determination unit 102 determines the order of visitation such that the worker visits the bulletins 60 in the order of distances from shorter to longer distances between the image forming apparatus 30 and each of the bulletins 60, or such that the worker visits the bulletins 60 in the order of distances from longer to shorter distances between the image forming apparatus 30 and each of the bulletins 60.

If the order of visitation is determined based on the "order of sizes", the information acquisition unit 101 refers to the information (concerning the sizes of paper sheets) stored on the printing information memory 105 (see FIG. 10), and acquires the information on the paper sheet sizes. The order determination unit 102 determines the order of visitation, based on the information on the sizes. Specifically, the order determination unit 102 determines the order of visitation such that the worker visits earlier the posting location of a larger bulletin 60 than the posting location of a smaller bulletin 60.

If the order of visitation is determined based on the "order determined depending on whether the tool is used", the information acquisition unit 101 refers to the information (concerning the tool) stored on the printing information memory 105, and acquires the information on the tool that is going to be used in the posting of each bulletin 60. The order determination unit 102 determines the order of visitation, based on the information on the tool. Specifically, the order determination unit 102 determines the order of visitation such that the worker visits earlier the posting location of a bulletin 60 that involves using a tool to post the bulletin 60 than the posting location of a bulletin 60 that does not involves using the tool to post the bulletin 60.

According to the exemplary embodiment, a single posting location may be selected from multiple enlisted posting locations (may be specified from multiple enlisted posting locations by the store operator). In such a case, the order determination unit 102 determines the order of visitation according to which the worker successively visits a subpart of the posting locations of the bulletins 60 instead of visiting all the posting locations. It will be noted that the order determination unit 102 determines the order of visitation according to which the worker successively visits the subpart of the bulletins 60 contained in the posting area specified by the store operator.

As previously described, the instruction sheet 70 is output as the printed matter that accounts for the order of visitation. The printed matter that accounts for the order of visitation is not limited to the instruction sheet 70. The printed matter that accounts for the order of visitation may be the bulletin 60 itself. The printed matter that accounts for the order of visitation may be the bulletin 60 that is going to be posted in the store.

In such a case, the instruction unit 103 provides an instruction to print the bulletin 60 as the instruction to output the printed matter that accounts for the order of visitation. Specifically, the instruction unit 103 provides the instruction to print the bulletins 60 such that the posting order of multiple bulletins 60 that the worker is going to post (the order of posting each bulletin 60 according to which the worker moves in accordance with the order of visitation determined by the order determination unit 102) matches the arrangement order of the bulletins 60 of in a pile having a stack of multiple bulletins 60.

According to the exemplary embodiment, as described above, the order determination unit 102 first determines the order of visitation. From the order of visitation determined by the order determination unit 102, the instruction unit 103 then learns the order of posting each of the bulletins 60 that the worker is going to post. The instruction unit 103 provides the instruction to print the bulletins 60 such that the posting order learned matches the arrangement order of each of the bulletins 60 (the arrangement order in each pile). The printed matter that accounts for the order of visitation is not limited to the instruction sheet 70 only or the bulletins 60 only, but may be a combination of the instruction sheet 70 and the bulletins 60.

The order determination unit 102 may now determine the order of visitation of the worker to be a first posting location, a second posting location and a third posting location in that order, a bulletin 60A may be posted at the first posting location, a bulletin 60B may be posted at the second posting location, and a bulletin 60C may be posted at the third posting location. The instruction unit 103 provides the instruction to print the bulletins 60 such that the bulletins 60 are stacked within the pile generated by the image forming apparatus 30. For example, in the pile, the bulletin 60C, the bulletin 60B, and the bulletin 60A may be stacked from bottom to top in that order, or the bulletin 60A, the bulletin 60B, and the bulletin 60C may be stacked from bottom to top in that order.

If the posting order of the bulletins 60 matches the arrangement order of the bulletins 60, the worker visits the bulletins 60 in the order of visitation determined by the order determination unit 102 by performing the posting job of the bulletins 60 (by picking up the bulletins 60 in order from one side of the pile).

Figure 15:
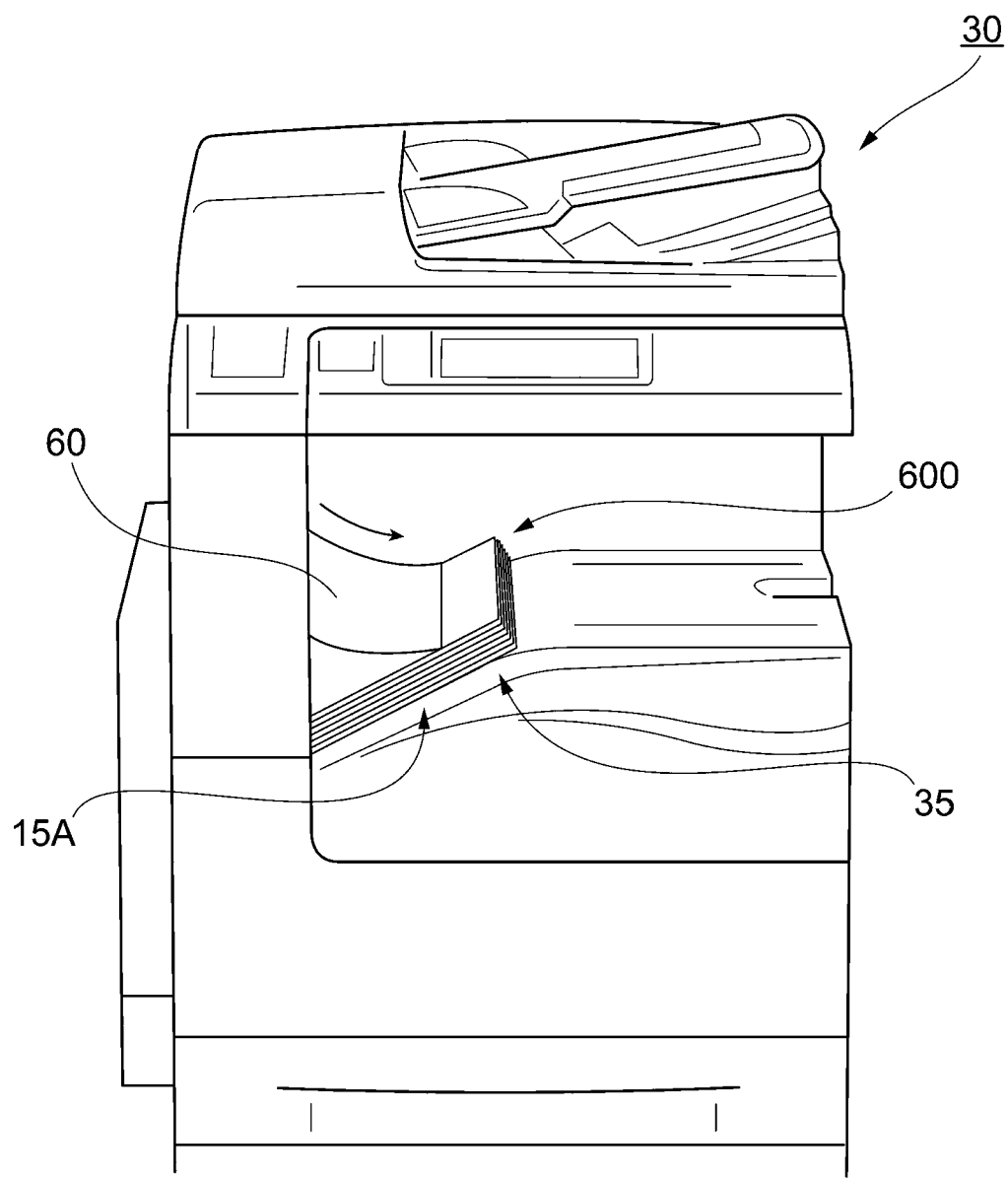
FIG. 15 illustrates an image forming apparatus.

The image forming apparatus 30 successively outputs the bulletins 60 as illustrated in FIG. 15 (illustrating the image forming apparatus 30). With reference to reference numeral 15A of FIG. 15, the image forming apparatus 30 successively stacks the bulletins 60 printed, and forms a pile 600 of the bulletins 60. According to the exemplary embodiment, the arrangement order of the bulletins 60 in the pile 600 formed matches the posting order of the bulletins 60.

Figure 16A:
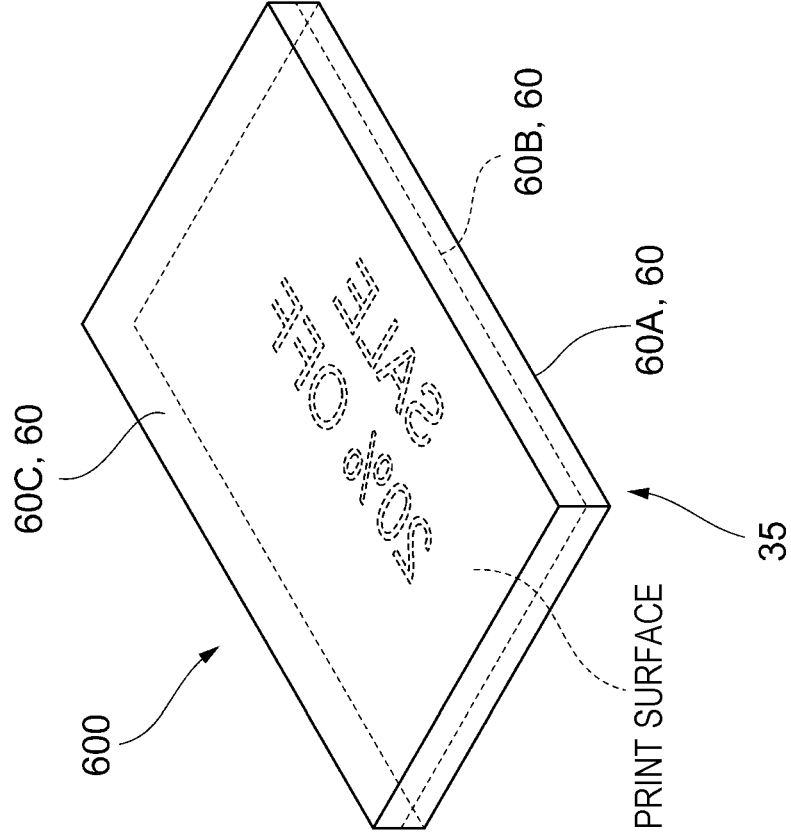
FIGS. 16A and 16B illustrate a stacked state of bulletins on the image forming apparatus.
Figure 16B:
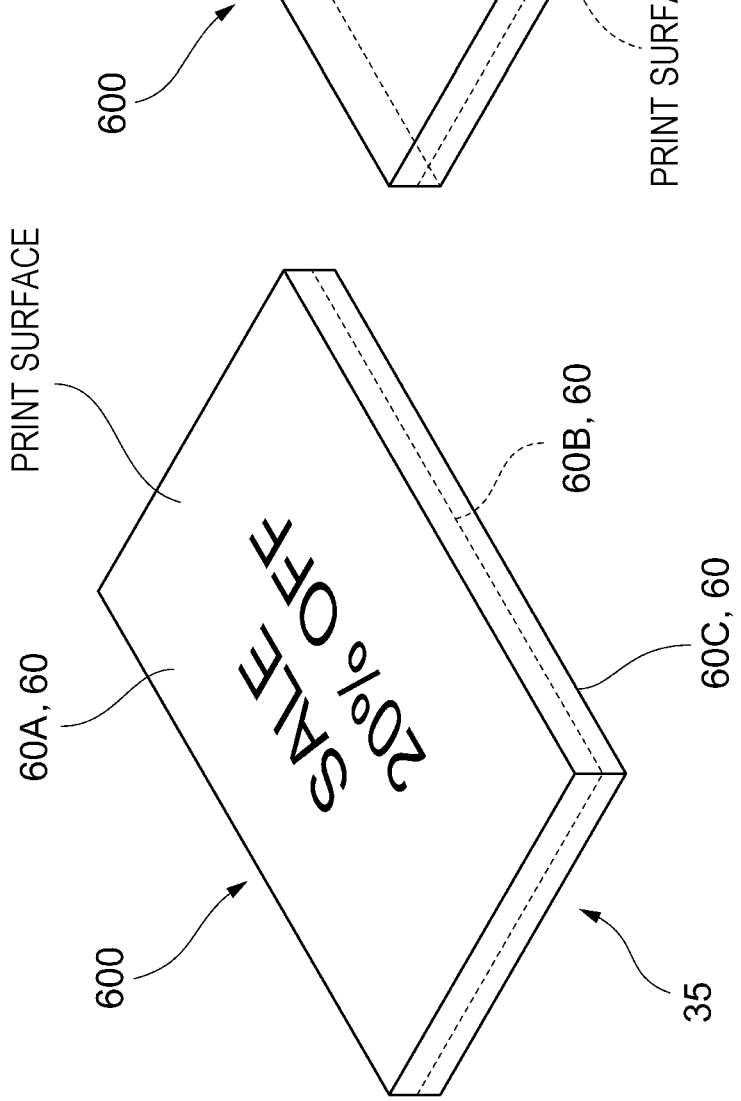

As a specific example, the worker may now visit the posting locations in the order of the first posting location (the posting location of the bulletin 60A), the second posting location (the posting location of the bulletin 60B), and the third posting location (the bulletin 60C) in that order. FIGS. 16A and 16B illustrate the stacked states of the bulletins 60 on the image forming apparatus 30. According to the exemplary embodiment, the pile 600 is formed by stacking the bulletins 60 on a base plate 35 of the image forming apparatus 30.

Referring to FIG. 16A, the bulletins 60 are stacked in the order of the bulletin 60C, the bulletin 60B, and the bulletin 60A in the order from bottom to top. In the pile 600 of FIG. 16A, the bulletin 60A that is posted earlier by the worker is placed on top of the bulletins 60B and 60C that are posted later. In the pile 600 of FIG. 16A, the print surface of each bulletin looks upward.

Referring to FIG. 16B, the bulletins 60 are stacked in the order of the bulletin 60A, the bulletin 60B, and the bulletin 60C in the order from bottom to top. In the pile 600 of FIG. 16B, the posting order of the bulletins 60 matches the arrangement order of the bulletins 60. On the other hand, the bulletin 60A that is posted earlier by the worker is placed beneath the bulletins 60B and 60C that are posted later. The print surface of each bulletin looks downward. The worker thus places the pile 600 upside down in the posting job.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing system comprising:
    a processor programmed to function as:
        an information acquisition unit that acquires information on a plurality of bulletins to be posted in posting locations that are different from each other;
        a determination unit that determines, based on the information, an order of visitation according to which a worker posting bulletins visits each of the posting locations; and an instruction unit that provides an instruction to output printed matter that accounts for the determined order of visitation,
wherein the instruction unit provides an instruction to print the bulletins as the instruction to output the printed matter that accounts for the order of visitation, the instruction being printed on a screen that is provided to the worker posting the bulletins,
wherein the information acquisition unit acquires information on a number of copies of each of the bulletins, and
wherein the determination unit determines the order of visitation, based on the information on the number of copies.

2. The information processing system according to claim 1, wherein the instruction unit provides the instruction to print the bulletins such that an order of posting the bulletins to be posted by the worker matches an order of arrangement of the bulletins in a pile, the pile including the printed bulletins.

3. The information processing system according to claim 2, wherein the instruction unit provides the instruction to print such that a bulletin that is to be posted earlier by the worker is on top of a bulletin that is to be posted later when bulletins printed by a printer are successively stacked to form the pile on the printer.

4. The information processing system according to claim 3, wherein the instruction unit provides the instruction to print such that a print surface of each bulletin faces upward when the bulletins are successively stacked on the printer to form the pile.

5. The information processing system according to claim 1, wherein the instruction unit provides the instruction to output the printed matter that contains information on the order of visitation, as the instruction to output the printed matter that accounts for the order of visitation.

6. The information processing system according to claim 5, wherein the information acquisition unit provides the instruction unit to output the printed matter that contains the information on the order of visitation and information indicating each of the posting locations.

7. The information processing system according to claim 1, wherein the determination unit determines the order of visitation such that the worker visits earlier a posting location where a higher number of copies of each of the bulletins is to be posted than a posting location where a lower number of copies of each of the bulletins is to be posted.

8. The information processing system according to claim 1, wherein the determination unit determines the order of visitation according to which the worker visits positing locations of a subpart of the bulletins to be posted in a region specified by an operator.

9. An information processing system comprising:
a processor programmed to function as:
an information acquisition unit that acquires information on a plurality of bulletins to be posted in posting locations that are different from each other;
a determination unit that determines, based on the information, an order of visitation according to which a worker posting bulletins visits each of the posting locations; and
an instruction unit that provides an instruction to output printed matter that accounts for the determined order of visitation,
wherein the instruction unit provides an instruction to print the bulletins as the instruction to output the printed matter that accounts for the order of visitation, the instruction being printed on a screen that is provided to the worker posting the bulletins,
wherein the information acquisition unit acquires information on a size of each of the bulletins, and
wherein the determination unit determines the order of visitation, based on the information on the size.

10. The information processing system according to claim 9, wherein the determination unit determines the order of visitation such that the worker visits earlier a posting location where a bulletin larger in size is to be posted than a posting location where a bulletin smaller in size is to be posted.

11. A non-transitory computer readable medium storing a program causing a computer to execute a process for acquiring information, the process comprising:
acquiring information on a plurality of bulletins to be posted in posting locations that are different from each other;
based on the information, determining an order of visitation according to which a worker posting bulletins visits each of the posting locations; and
providing an instruction to output printed matter that accounts for the determined order of visitation,
wherein the providing the instruction further includes providing an instruction to print the bulletins as the instruction to output the printed matter that accounts for the order of visitation, the instruction being printed on a screen that is provided to the worker posting the bulletins,
wherein the acquiring information includes acquiring information on a number of copies of each of the bulletins, and
wherein the determining determines the order of visitation based on the information on the number of copies.

* * * * *